United States Patent [19]

Watanabe et al.

[11] 4,019,138
[45] Apr. 19, 1977

[54] FREQUENCY SYNCHRONIZING SYSTEM FOR SATELLITE COMMUNICATION

[75] Inventors: Tatsuo Watanabe, Mitaka; Hideki Saito, Tachikawa, both of Japan

[73] Assignee: Kokusai Denshin Denwa Kabushiki Kaisha, Japan

[22] Filed: Feb. 19, 1976

[21] Appl. No.: 659,362

[30] Foreign Application Priority Data

Feb. 24, 1975 Japan .............................. 50-21867

[52] U.S. Cl. ............................... 325/4; 178/69.1; 325/17; 325/58; 325/63; 343/7.5
[51] Int. Cl.[2] .......................................... H04B 7/14
[58] Field of Search ............ 178/69.5 R; 325/4, 17, 325/58, 63, 7 R, 7.5, 100 ST, 179; 179/15 BP

[56] References Cited
UNITED STATES PATENTS

| | | | |
|---|---|---|---|
| 3,430,237 | 2/1969 | Allen | 325/4 |
| 3,646,444 | 2/1972 | Bitzer | 325/58 |
| 3,835,253 | 9/1974 | Bond | 325/4 |
| 3,906,364 | 9/1975 | Dobson | 325/4 |
| 3,940,695 | 2/1976 | Sickles | 325/63 |

*Primary Examiner*—Robert L. Griffin
*Assistant Examiner*—Michael A. Masinick
*Attorney, Agent, or Firm*—Robert E. Burns; Emmanuel J. Lobato; Bruce L. Adams

[57] ABSTRACT

A frequency synchronizing system for satellite communication, in which a reference frequency coming from a communications satellite is received by a receiving circuit. A first frequency variable oscillator is provided for generating a transmission signal. A second receiving circuit is provided for receiving through the communications satellite the transmission signal which is the output from the first frequency variable oscillator. A first frequency control circuit is provided for controlling the first frequency variable oscillator for making the frequencies of the outputs from the first and second receiving circuits equal to each other. A second frequency variable oscillator is provided for generating a signal of a frequency twice as high as the reference frequency. A frequency converter is provided for mixing the output from the first or second receiving circuit with the output from the second frequency variable oscillator to produce a signal of a difference frequency substantially equal to that of the transmission signal. A phase detector detects the phase difference between the transmission signal and the output from the frequency converter. A frequency control circuit is provided for controlling the second frequency variable oscillator with the output of the phase detector so that the output frequency of the second frequency variable oscillator is twice as high as the frequency of the reference signal on the communications satellite. The first frequency variable oscillator is replaced by a reference oscillator of constant frequency in a reference station.

2 Claims, 3 Drawing Figures

FREQUENCY SYNCHRONIZING SYSTEM FOR SATELLITE COMMUNICATION

FIELD OF THE INVENTION

This invention relates to a frequency synchronizing system for the production of the same frequency at which all relative terrestrial stations are synchronized with each other using a communication satellite.

BRIEF DESCRIPTION OF THE PRIOR ART

At present, international communications employing stationary communication satellites are widely put to practice all over the world, providing important communication networks together with submarine cables. Especially, the satellite communication is usually controlled in the TDMA (Time Division Multiple Access) system of the type in which all relative terrestrial stations use the same frequency band in a time division manner for the purposes of maintaining merits of the PCM communication system and for more efficient use of the satellite. When the communication system has thus been digitalized and when many countries have been linked with digital communication networks, the most important problem is means for system snychronization of these networks. However, since the clock frequencies of different countries or localities differ from one another, the train transmitted from one country or locality to another is not synchronized with the clock frequency of each receiving station. Accordingly, techniques such as stuffing or frame slipping or the like are necessary for signal processing and signal transmission to other stations.

A satellite communication system is a radio relay system and has a multiple access function which enables interconnecting a plurality of stations. Accordingly, the satellite communication system is suitable for use as means for distributing the reference clock frequency, but a problem in the distribution of a reference frequency through the satellite is Doppler effect (frequency deviation effect) resulting from the relative movement of the satellite against a transmission point on the earth. The amount of frequency deviation due to Doppler effect differs at different terrestrial stations since their geographical conditions are different from each other. Accordingly, mere distribution of the reference clock frequency from a master station to each one of slave stations through the communication satellite results in such a phenomenon that the reference clock frequency received by each slave station differs from those received by the other stations because of a different amount of Doppler effect.

BRIEF SUMMARY OF THE INVENTION

An object of this invention is to provide a frequency synchronizing system for satellite communication which enables all related terrestrial stations to reproduce the same clock frequency which is free from frequency fluctuations caused by Doppler effect.

In accordance with this invention, a frequency synchronizing system for satellite communication is provided, which comprises: a first receiving circuit for receiving a signal of a reference frequency coming from a communications satellite; a first frequency variable oscillator for generating a transmission signal from the same station; a second receiving circuit for receiving through the communication satellite the transmission signal which is the output from the first frequency variable oscillator; first frequency control means for controlling the first frequency variable oscillator for making the frequencies of the outputs from the first and second receiving circuits equal to each other; a second frequency variable oscillator for generating a signal of a frequency twice as high as the reference frequency; a frequency converter for mixing the output from the first or second receiving circuit with the output from the second frequency variable oscillator to produce a signal of a difference frequency substantially equal to that of the transmission signal; a phase detector for detecting the phase difference between the transmission signal and the output from the frequency converter; and frequency control means for controlling the second frequency variable oscillator with the output of the phase detector so that the output frequency of the second frequency variable oscillator is twice as high as the frequency of the reference signal on the communications satellite.

The frequency synchronizing circuit for satellite communication may comprise in a reference station, for establishing the signal of the reference frequency on the communication satellite, a variable frequency oscillator for generating a reference transmission signal of a frequency approximate to a reference frequency; a receiving circuit for receiving the reference transmission signal through the communications satellite; a reference oscillator for generating a signal of a constant frequency substantially twice as high as the reference frequency; a frequency converter for producing a signal of a frequency equal to the frequency difference between the outputs from the reference oscillator and the receiving circuit; and a phase detector for obtaining the phase difference between the outputs from the frequency converter and the variable frequency oscillator and for applying the phase difference to the variable frequency oscillator to control the same to decrease the phase difference.

In accordance with this invention, the reference clock frequency reproduced in each terrestrial station is distributed to a master station of the domestic network of each country, by which clock frequencies of the synchronous networks of the relative countries can be made equal to each other, thus achieving clock synchronization of digital networks among many countries. Further, this invention produces the following effect in the interface between the terrestrial synchronization system and the satellite communication system. That is, in the case where this invention is applied to the satellite communication system, the clock frequencies of the relative terrestrial stations are all rendered into the same clock frequency. In this case, if each terrestrial station transmits a digital signal to another through the communication satellite by using the clock frequency, this clock frequency differs from that of other terrestrial station due to the Doppler effect resulting from the relative movement of the satellite. In practice, the satellite repeats an increase and decrease in a Doppler frequency with a period of one day, so that the satellite communication system can be synchronized with the terrestrial synchronization system by the use of an elastic memory capable of absorbing a delay and a change of the Doppler frequency. Namely, the factor which determines the required capacity of a buffer memory indispensable to the interface between the terrestrial synchronization systems and the satellite synchronization system is only the amount of frequency deviation due to Doppler effect, that is, the amount of delay and change between the terrestrial station and the satellite with the period of one day. If the slave station employs a buffer memory absorbing only the frequency fluctuation due to Doppler effect, it is possible to realize the construction of a synchronous network of high transmission efficiency with no information loss without requiring such techniques as stuffing, slipping, etc. which have heretofore been regarded as indispensable to coupling of the terrestrial system and the satellite communication system of different clock frequencies.

BRIEF DESCRIPTION OF THE DRAWINGS

The principle, construction and operation of this invention will be dearly understood from the following detailed description taken in conjunction with the accompanying drawings.

DETAILED DESCRIPTION OF THE INVENTION

Figure 1:
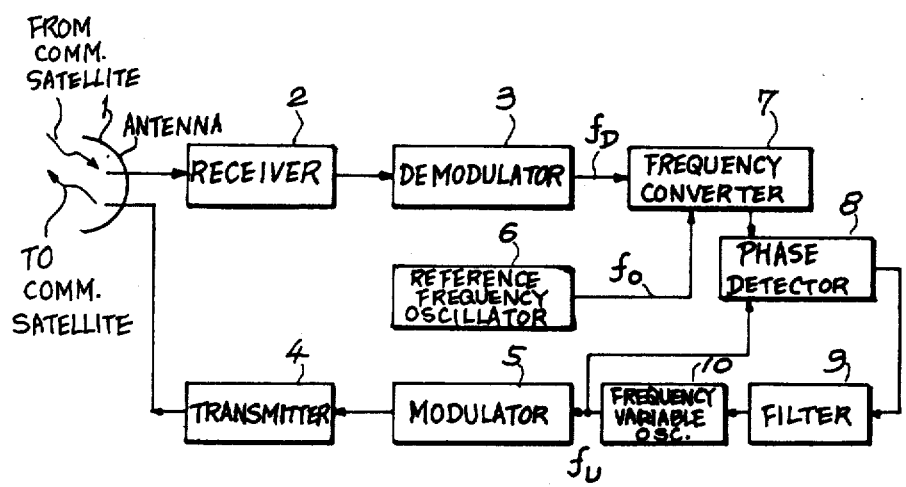
FIG. 1 is a block diagram illustrating an embodiment of this invention provided in a reference station of a satellite communication system.

A description will be given first of the reference station. With reference to FIG. 1, reference numeral 1 indicates a transmitting-receiving antenna; and 2 designates a receiver provided for a frequency band from the radio frequency to the intermediate-frequency and composed of a low-noise amplifier, a frequency converter and a band-pass filter (BPF) for selecting only a desired frequency signal. Reference numeral 3 identifies a demodulator for detecting a reference frequency included in the intermediate-frequency output from the receiver 2; 5 denotes a modulator for modulating a carrier wave with a sending reference frequency; and 4 represents a transmitter. Reference numeral 6 shows a reference frequency oscillator for producing a reference frequency wave $f_0$ to be reproduced at a remote receiving station through a satellite. Reference numeral 7 refers to a frequency converter which selects a difference frequency between the frequency $f_0$ of the output of the reference oscillator 6 and a frequency $f_D$ of a received, demodulated signal. Reference numeral 8 indicates a phase detector; 9 designates a loop filter; and 10 identifies a frequency variable oscillator such, for example, as a voltage controlled oscillator employing a quartz resonator. These elements 8, 9 and 10 make up a phase synchronizing loop.

If the frequency of the reference frequency oscillator 6 is taken as $f_0$ and if the frequency of the voltage controlled oscillator 10 is taken as $f_U$, this output signal of frequency $f_U$ is applied as an input to the modulator 5 and transmitted to a communication satellite through the transmitter 4. However, the communication satellite moves as mentioned previously. If the relative velocity of the communication satellite to the point of transmission on the earth is taken as, $dR/dt$ the frequency $f_u$ becomes a frequency $f_{Ua}$ due to Doppler effect when arriving at the communication satellite. Now, let it be assumed that the frequency shift by Doppler effect is positive. In this case, the frequency $f_{Ua}$ at the communication becomes as follows:

$$f_{Ua} = f_U \left(1 + \frac{1}{c} \cdot \frac{dR}{dt}\right) \tag{1}$$

(where C is the light velocity and $dR/dt$ is the relative velocity of the communication satellite.) This frequency $f_{Ua}$ is relayed by the communication satellite and received again at the same point as the transmitting station. But, the received frequency is affected by Doppler effect again and received as a frequency $f_{Ub}$. That is, $$\begin{aligned} f_{Ub} &= f_{Ua}\left(1 + \frac{1}{c} \cdot \frac{dR}{dt}\right) \\ &= f_U\left(1 + \frac{1}{c} \cdot \frac{dR}{dt}\right)^2 \\ &= f_U\left\{1 + \frac{2}{c}\left(\frac{dR}{dt}\right) + \left(\frac{1}{c} \cdot \frac{dR}{dt}\right)^2\right\} \end{aligned} \tag{2}$$

Figure 3:
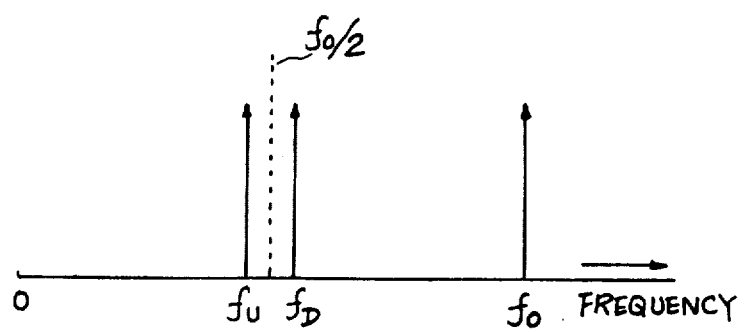
FIG. 3 is a diagram of an arrangement of frequencies explanatory of the operation of this invention.

If $f_{Ub}$ is replaced by $f_D$ and if $f_U$ substantially equal to $f_0/2$, the relationships of $f_u$, $f_D$ and $f_0$ become such as shown in FIG. 3.

In FIG. 3, conditions under which a difference between $f_D$ and $f_0$ is equal to $f_U$ are as follows:

$$f_0 - f_D = f_U$$

$$f_0 - f_U\left\{1 + 2\frac{1}{c} \cdot \frac{dR}{dt} + \left(\frac{1}{c} \cdot \frac{dR}{dt}\right)^2\right\} = f_U$$

$$f_0 = 2f_U\left(1 + \frac{1}{c} \cdot \frac{dR}{dt}\right) + f_U\left(\frac{1}{c} \cdot \frac{dR}{dt}\right)^2$$

$$\tfrac{1}{2}\left\{f_0 - f_U\left(\frac{1}{c} \cdot \frac{dR}{dt}\right)^2\right\} = f_U\left(1 + \frac{1}{c} \cdot \frac{dR}{dt}\right)$$

$$\tfrac{1}{2}f_0 - \tfrac{1}{2}f_U\left(\frac{1}{c} \cdot \frac{dR}{dt}\right)^2 - f_U - f_U \cdot \frac{1}{c} \cdot \frac{dR}{dt} = 0$$

$$\tfrac{1}{2}f_0 - f_U\left[1 + \left\{\frac{1}{c} \cdot \frac{dR}{dt} - \tfrac{1}{2}\left(\frac{1}{c} \cdot \frac{dR}{dt}\right)^2\right\}\right] = 0 \tag{3}$$

The second term $$f_U\left(\frac{1}{c} \cdot \frac{dR}{dt}\right)^2$$

in { } of the left side of equation (3) is very much smaller than the first term $$\frac{1}{c} \cdot \frac{dR}{dt}$$

(normally about $10^{-8}$), so that the second term is sufficiently negligible and $f_0/2$ can be equal to $$f_U \left(1 + \frac{1}{c} \cdot \frac{dR}{dt}\right).$$

That is, $f_U$ becomes $$f_c \left(1 + \frac{1}{c} \cdot \frac{dR}{dt}\right)$$

on the communication satellite under the influence of Doppler effect and is equal to $f_0/2$.

The above-mentioned principles will be described with reference to circuits shown in FIG. 1. The frequency converter 7 is a circuit for selecting a difference $(f_0-f_D)$ and the phase synchronizing loop made up by the elements 8, 9 and 10 performs an operation for making the difference frequency $f_0-f_D$ equal to the transmitted reference frequency $f_U$. Namely, this loop controls the frequency of the voltage controlled oscillator 10 in such a manner that the output from the phase detector 8 may always be zero. If the synchronized state is established by the above operations, the frequency $f_0/2$ is reproduced on the communication satellite at all times.

Figure 2:
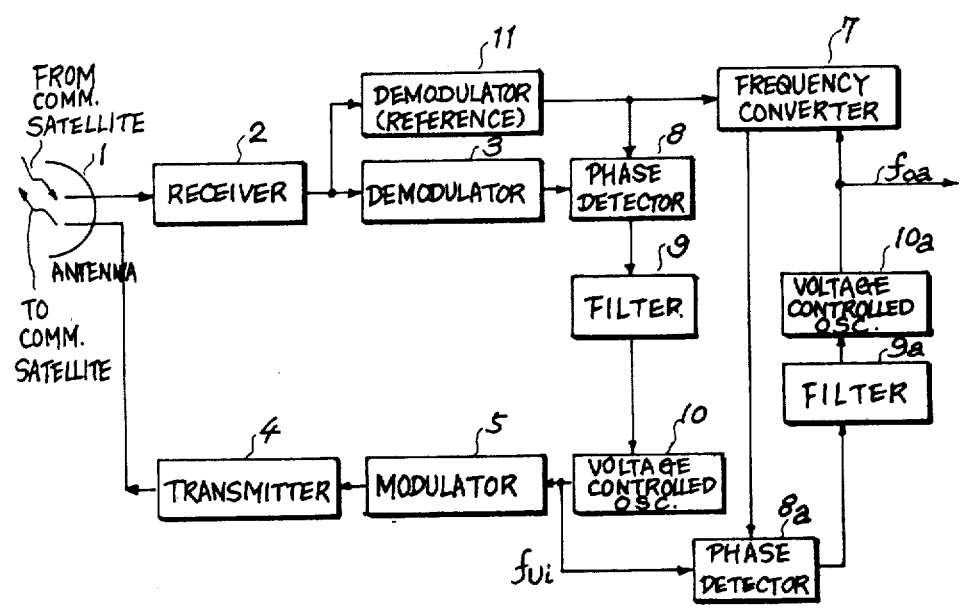
FIG. 2 is a block diagram showing another embodiment of this invention provided in each station of the satellite communication system.

Turning now to FIG. 2, a description will be made in connection with a case where a station (hereinafter referred to as a slave station) other than the reference station reproduces the abovesaid reference frequency transmitted from the communications satellite by eliminating the influence of Doppler effect. In FIG. 2, the same reference numerals as those in FIG. 1 indicate the same instruments and new reference numeral 11 designates a demodulator which produces the reference frequency signal affected by Doppler effect from a signal transmitted from the satellite. A phase synchronizing loop for producing a frequency $f_{Ui}$ of a transmitted wave is made up with the elements 8, 9 and 10 including the frequency converter 7. Further, for the production of a frequency synchronized with the frequency of the reference station, a phase detector 8a, a loop filter 9a and a voltage controlled oscillator 10a including the frequency converter 7 form another phase synchronizing loop.

The operation of the above slave station will hereinbelow be described. At first, the slave station receives a signal (hereinafter defined by $f_{DR}$) of the frequency $f_0/2$ realized on the communication satellite and, at the same time, receives a signal (hereinafter identified by $f_{Di}$) of a frequency $f_{Ui}$ transmitted from this slave station, and the receiving side thereof controls the transmitted frequency $f_{Ui}$ so that $f_{DR}$ is equal to $f_{Di}$. That is, the slave station receives the reference frequency signal from the communication satellite and the signal of the same station retransmitted via the communication satellite by the demodulators 11 and 3, respectively, and detects the phase difference between the received two signals by the phase detector 8 and then controls the voltage controlled oscillator 10 so that the phase difference may be zero. When $f_{DR}$ is equal to $f_{Di}$, since the both received signals are equally affected by Doppler effect at the path between the communication satellite and the slave station, their frequencies are exactly equal to each other on the satellite. Namely, this implies that $f_{Ui}$ has become $f_U2$ on the satellite.

Now, the frequency of the output wave of the voltage controlled oscillator 10a is taken as $f_{Oa}$. By applying the output signal $f_{DR}$ from the demodulator 11 (which may be $f_{Di}$ in the synchronized state) and the frequency $f_{Oa}$ to the frequency converter 7, a signal of frequency $(f_{Oa} - f_{DR})$ is produced at the output of the converter 7. Then, the resulting signal of frequency $(f_0 31 f_{DR})$ and the signal of frequency $f_{Ui}$ are applied to the phase detector 8a, and the voltage controlled oscillator 10a is controlled by the output of the phase detector 8a in such a manner that the output of the phase detector 8a may be zero. If the relation: $(f_{Oa} - f_{DR}) = f_{Ui}$ is established, the frequency $f_{Oa}$ at this time becomes as follows:

$$f_{DR} = \frac{f_0}{2}\left(1 + \frac{1}{c} \cdot \frac{dR}{dt}\right), f_{Ui}\left(1 + \frac{1}{c} \cdot \frac{dR}{dt}\right) = \frac{f_0}{2}$$

therefore, $$f_{Oa} - \frac{f_0}{2}\left(1 + \frac{1}{c} \cdot \frac{dR}{dt}\right) = \frac{f_0}{2}\left\{1 - \frac{1}{c} \cdot \frac{dR}{dt}\right\}^2 \quad (4)$$

In the above equation (4), the third term and the following in { } are very much smaller than the second term, and hence can be omitted. Then, the above equation is rewritten as follows $$f_{Oa} = \frac{f_0}{2}\left(1 + \frac{1}{C} \cdot \frac{dR}{dt}\right) + \frac{f_0}{2}\left(1 - \frac{1}{c} \cdot \frac{dR}{dt}\right) \quad (5)$$

therefore, $$f_{Oa} = f_0$$

That is, the frequency $f_{Oa}$ becomes equal to the frequency $f_0$ and the frequency $f_0$ in the reference station can be reproduced in the slave station. The relation $(f_{Oa} - f_{DR}) = f_{Ui}$ can be realized by the phase synchronizing loop made up with the elements 8a, 9a, 10a and 7 in FIG. 2.

In accordance with this invention, in case of transmitting a reference frequency of a reference station to another terrestrial station via a satellite, a frequency synchronized with the reference station can be reproduced at the slave station without being affected by Doppler effect resulting from the movement of the satellite against the position of the slave station.

Although the foregoing description has been given in connection with the case where the reference frequency is established on the communication satellite by the reference station (FIG. 1) provided on the earth, it is evident that if the communication satellite is provided with a generator of a signal of the reference frequency, such a reference station equipment as shown in FIG. 1 is unnecessary.

Another embodiment of the invention based on the above concept can be considered such as follows: Namely, the reference clock producing means can be obtained by allocating as reference stations a plurality of stations constituting an international network and forming a mutual synchronizing system among these stations via a communication satellite. Accordingly, it is possible that a frequency given by the mean value of the frequencies of the slave stations on the satellite is used as a reference clock frequency and that the reference clock frequency is reproduced in each station by the use of a circuit having the same construction as depicted in FIG. 2.

What we claim is:

1. A frequency synchronizing system for satellite communication, comprising:
   a first receiving circuit for receiving a signal of a reference frequency coming from a communications satellite;
   a first frequency variable oscillator for generating a transmission signal;
   a second receiving circuit for receiving through the communications satellite the transmission signal which is the output from the first frequency variable oscillator;
   first frequency control means for controlling the first frequency variable oscillator for making the frequencies of the outputs from the first and second receiving circuits equal to each other;
   a second frequency variable oscillator for generating a signal of a frequency twice as high as the reference frequency;
   a frequency converter for mixing the output from the first receiving circuit with the output from the second frequency variable oscillator to produce a signal of a difference frequency substantially equal to that of the transmission signal;
   a phase detector for detecting the phase difference between the transmission signal and the output from the frequency converter; and
   second frequency control means for controlling the second frequency variable oscillator so that the output frequency of the second frequency variable oscillator is twice as high as the frequency of the reference signal on the communications satellite.

2. A frequency synchronizing circuit for satellite communication, comprising:
   a variable frequency oscillator for generating a reference transmission signal of a frequency approximate to the reference frequency;
   a receiving circuit for receiving the reference transmission signal through the communications satellite;
   a reference oscillator for generating a signal of a constant frequency substantially twice as high as the reference frequency;
   a frequency converter for producing a signal of a frequency of the difference between the outputs from the reference oscillator and the receiving circuit; and
   a phase detector for obtaining the phase difference between the outputs from the frequency converter and the variable frequency oscillator and applying the phase difference to the variable frequency oscillator to control it to decrease the phase difference.

* * * * *